Figure 1:
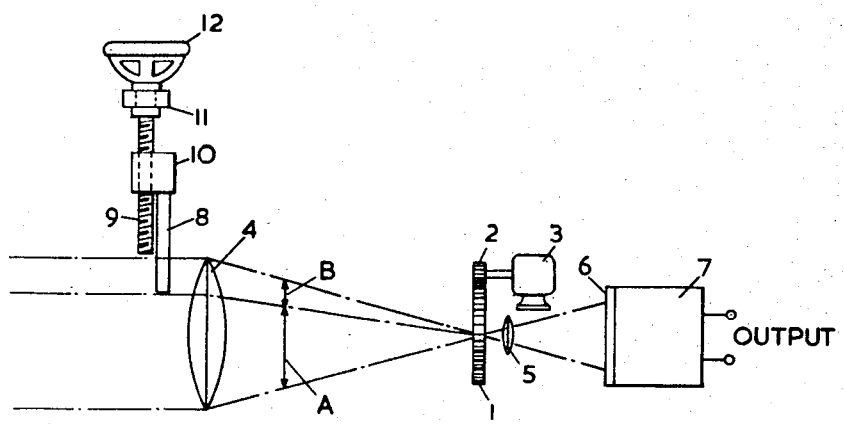

United States Patent [19]
Jones

[11] 3,821,551
[45] June 28, 1974

[54] RADIATION DETECTION SYSTEM COMPRISING TWO SETS OF FILTERS FOR EFFECTIVE CHOPPING

[75] Inventor: Sydney Jones, Malvern, England

[73] Assignee: The Minister of Supply in Her Majesty's Government of the United Kingdom of Great Britain and Northern Ireland, London, England

[22] Filed: Mar. 12, 1954

[21] Appl. No.: 415,833

[30] Foreign Application Priority Data
Mar. 14, 1953  Great Britain ..................... 7,129/53

[52] U.S. Cl. ............................. 250/233, 250/83.3 H
[51] Int. Cl. ............................................. G01d 5/36
[58] Field of Search .................... 250/203, 226, 236, 250/83.3, 83.3 H, 83.3 HP, 233

[56] References Cited
UNITED STATES PATENTS
1,898,219   2/1933   Sharp ................................. 250/226

Primary Examiner—Carl D. Quarforth
Attorney—R. S. Sciascia; P. Schneider

[57] ABSTRACT

A radiation detector device utilizing chopper techniques to distinguish between background and target signals. Choppers comprising two sets of filters are used, with the spectral transmission properties so determined that unwanted radiation is unchopped.

9 Claims, 4 Drawing Figures

PATENTED JUN 28 1974    3,821,551

SYDNEY JONES
*Inventor*

By [signature]
*Attorney*

RADIATION DETECTION SYSTEM COMPRISING TWO SETS OF FILTERS FOR EFFECTIVE CHOPPING

This invention relates to the detection of radiation using chopper techniques. It relates to detection systems in which choppers are used comprising two sets of chopper filters, the spectral transmission properties of each set being so determined that interfering or unwanted radiation having one given spectral distribution is effectively unchopped.

These chopper techniques are the subject-matter of my co-pending British Pat. application No. 18635/51 (U.S. Ser. No. 302,105).

In my co-pending Application No. 18635/51 it is pointed out how the equalizing or balancing of the unwanted radiation through the filters of the two sets which make up a typical chopper depends upon several factors. These factors include:

a. the different spectral responses of different detecting cells;

b. the change in spectral response which may occur in the background field.

In general the efficiency of discrimination between background and target depends upon any factor which can affect the relative strengths of the background signals in the radiation detector, that is the relative strengths of those signals which correspond to the detected background energy viewed through chopper filters of one set or the other.

Such a factor causes deterioration of the performance of a detection system because the choice of filters must necessarily be determined to suit a given set of spectral circumstances; that is given spectral conditions experienced by radiation, especially unwanted radiation, incoming to the detector, any change in which is likely to upset the balancing action.

It is desirable therefore that some provision should be made to enable the balancing action to be performed in respect of the background signals even if the given set of circumstances for which the filters are designed should change. Alternatively even if the given set of circumstances remains unchanged it may be desirable to be able to make some adjustment of the preset type which could help to counteract inaccuracies of manufacture or setting up which would cause unbalance of the detected energy signals in the detector.

It is accordingly an object of the invention to do this.

According to the invention a radiation detection system according to co-pending Application No. 18635/51 (British) or Ser. No. 302,105 (U.S.A.) in which the chopped detector signals due to interfering or unwanted radiation having a given spectral distribution are effectively equalized comprises, means for modifying the spectral transmission characteristics of the system for radiation incoming to the detector, whereby detector signals due to radiation passing through chopper filters of one set can be adjusted relative to detector signals due to radiation passing through chopper filters of the other set to cater for a different set of spectral circumstances from those for which the original filters were suited.

Conveniently said means comprises an auxiliary filter inserted in the radiation transmission path. For a new set of circumstances which causes an increase in the detector signals due to the unwanted radiation passing through the filter having the stop band, relative to the signals due to the unwanted radiation passing through the fractional transmission band of the fractional (small percentage) transmission filter, the auxiliary filter is arranged to have fractional transmission in the stop band and to be substantially transparent outside the stop band.

An alternative form of filter for a similar set of circumstances comprises a filter having a pass region above a predetermined wavelength in the stop band of the filter having the stop band and no transmission below that predetermined wavelength. The choice of the predetermined wavelength will determine the degree of insertion required for the third filter and within wide limits will not be a critical factor in the success of techniques using the third filter. Conveniently it may be below the point at which the spectral response of a source of wanted radiation is negligible.

For another set of circumstances which causes a relative decrease in the detected energy due to the unwanted radiation passing through the filter having the stop band instead of the relative increase referred to above, the auxiliary filter is correspondingly arranged to have a fractional transmission outside the stop band and to be substantially transparent within the stop band.

Provision may also be made for adjusting the degree of insertion of the auxiliary filter in the radiation transmission path. This enables equalization of signals corresponding to the unwanted radiation to be made without recourse to calculation and has the advantages of speed and accuracy.

In order that the invention may be more clearly understood an embodiment of it will now be described reference being made to the accompanying drawings in which:

FIG. 1 shows a modified two-color chopper type radiation detection system, and

Figure 2A:
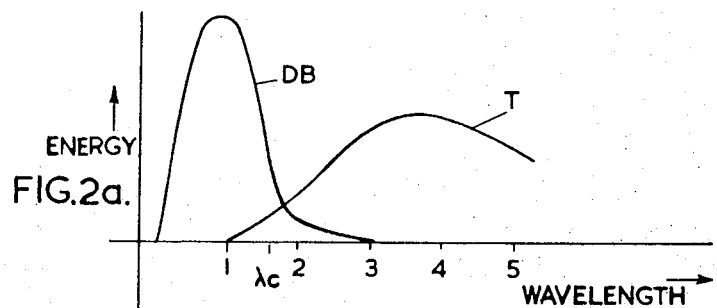
Figure 2B:
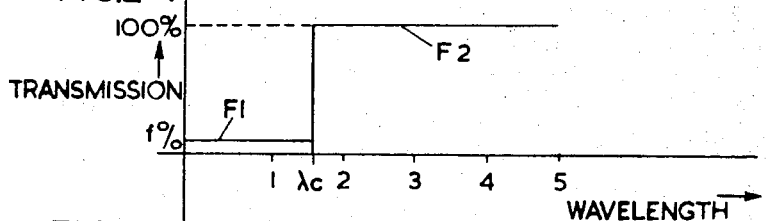
Figure 2C:
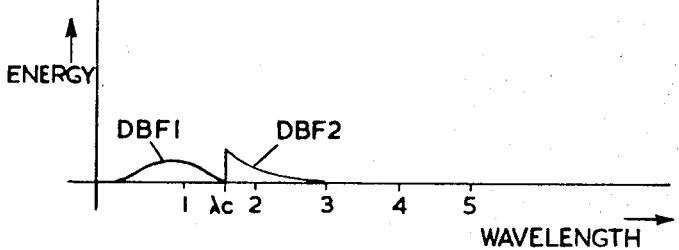

FIG. 2a–c shows certain characteristic curves of use in understanding the invention.

In FIG. 1 a chopper arrangement comprises a chopper 1 of the type having two sets of filters and driven by a rim gear from a pinion 2 of a motor 3. An objective lens 4 focuses incoming radiation onto the chopper 1. Radiation transmitted through the chopper 1 passes via a field lens 5 to the radiation sensitive layer 6 of a radiation detector 7.

An auxiliary filter 8 is inserted in the transmission path near the objective lens 4 and is controlled, by rotation of a screwed shaft 9, to be movable into or out of the radiation transmission path as desired. The screwed shaft 9 cooperates with a nut 10 attached to the filter 8 and is rotated by means of a handwheel 12. The shaft 9 is supported by a collar 11. The transmitted radiation in the part A of the pencil of radiation is unaffected but that in the part B of the pencil is modified by the auxiliary filter 8.

The characteristics and adjustment of the filter 8 will now be discussed in relation to those of the chopper filters and to the spectral distributions of wanted and unwanted signals.

The chopper 1 as described in copending U.S. Pat. application No. 18635/51 consists of filters of two kinds arranged alternately. The filters of the first kind have a theoretical transmission characteristic $F_1$ as shown in FIG. 2b, that is a fractional (small percentage) transmission $f$ percent up to a wavelength $\lambda_c$ and opaque above the wavelength $\lambda_c$, and the filters of the second kind have a theoretical transmission characteristic $F_2$ as shown in FIG. 2b, that is a stop band opaque up to the wavelength $\lambda_c$ and full transmission above the wavelength $\lambda_c$.

With a spectral distribution DB for the unwanted radiation the filters $F_1$ and $F_2$ produce signals in the cell 7 of the radiation detector having spectral distributions $DBF_1$ and $DBF_2$. Now if $\lambda_c$ is so chosen when designing the filters $F_1$ and $F_2$ that these signals are equal then no resultant chopped signal is apparent in the output of the radiation detector 7. On the other hand once $\lambda_c$ has been chosen and the chopper filters $F_1$ and $F_2$ designed any change of characteristics of the radiation detector 7 or the spectral distribution DB of the unwanted radiation will upset this equalization of the signals and so the chopper performance will deteriorate.

Now consider the auxiliary filter 8 to be made with a largely transparent band in the region up to the wavelength $\lambda_c$ and partially opaque in the region above the wavelength $\lambda_c$. Should then, for example, the spectral distribution DB of the unwanted radiation change so that the signal $DBF_2$ is increased relative to $DBF_1$ then by adjusting the filter 8 by means of the hand wheel 12 to modify the part B of the radiation pencil the signal $DBF_2$ can be reduced by virtue of the partially opaque region of the filter 8 without effecting the signal $DBF_1$; this is unaffected because of the transparent band of the filter 8. Thus, by such adjustment, the signals are equalized again and the effect of the unbalance minimized. Due, however to the fractional transmission of the filter 8 above the wavelength $\lambda_c$ the chopping efficiency will be somewhat reduced because the target signal (distribution T) will be affected by the fractional transmission.

Alternatively for a given system should the spectral distribution DB change so that the signal $DBF_1$ became bigger than $DBF_2$ then the use of a filter 8 largely transparent above the wavelength $\lambda_c$ and having a partially opaque band below the wavelength $\lambda_c$ will enable equalization to be achieved again by adjustment of the position of the filter 8 in the transmission path. In this case the chopping efficiency will be relatively unaffected owing to the filter 8 being largely transparent above the wavelength $\lambda_c$ where the target signal mainly resides.

The design of the filter 8 is not critical although care must be taken to prevent undue attenuation of wanted radiation (distribution T) when such radiation unavoidably lies within the partially opaque region of the auxiliary filter 8. In a large number of practical cases it will be found however that this condition either does not arise or may be avoided. For example in the case described when the radiation spectral distribution DB derives from a bright cloud edge the original system, i.e. the system without the auxiliary filter, can be designed for the set of circumstances when the spectral distribution DB is as far in the longer wavelength region (i.e. to the right in FIG. 2a) as is likely. In that case any movement of the distribution DB will tend to be towards the shorter wavelengths and the partially opaque region of the auxiliary filter 8 can be arranged to be in the unwanted radiation distribution and will not affect any wanted radiation such as that represented by the distribution T of FIG. 2a.

A further improvement may be affected practically in this case by designing the filter $F_1$ of the original system so that under normal conditions the signal $DBF_1$ is brought to a level rather higher than that necessary for true balancing to be achieved. The actual balance may then be made by adjustment of the insertion of the filter 8 according to the circumstances at the time.

Conveniently a typical auxiliary filter may possess the same characteristics as the filter $F_1$ below $\lambda_c$ and a pass region above $\lambda_c$.

In another typical construction of an auxiliary filter the filter comprised a 2 m.m. thickness of Chance Bros. $OX_2$ glass which is an infra-red transmitting glass; its characteristics approximated closely to: a transparent region above a wavelength $= 0.9\mu$, and no transmission below that wavelength. For typical variations of spectral distributions of bright cloud edges which would normally require a different value of $\lambda_c$ in the range $1.2\mu$ to $2.0\mu$ the $\lambda_c$ of $1.8\mu$ could be retained whilst the insertion of the auxiliary filter into the transmission path was varied according to the circumstances.

I claim:

1. A radiation detection system in which the chopped detector signals due to interfering or unwanted radiation having a given spectral distribution are effectively equalized comprising, a chopper having two sets of filters, a motor for driving the chopper, a radiation detector, lenses for focusing received radiation through the chopper onto the detector, and means for modifying the spectral transmission characteristics of the system for radiation incoming to the detector, whereby detector signals due to radiation passing through chopper filters of one set can be adjusted relative to detector signals due to radiation passing through chopper filters of the other set to cater for a different set of spectral circumstances from those for which the original filters were suited.

2. A radiation detection system as claimed in claim 1, wherein said means comprises an auxiliary filter for insertion in a limited portion only of the path of radiation incoming to the detector.

3. A radiation detection system as claimed in claim 2 for use in circumstances likely to cause an increase in the detector signals due to the unwanted radiation passing through the filters having the stop band, relative to the signals due to the unwanted radiation passing through the fractional transmission band of the other filters, wherein the auxiliary filter is a fractional transmission filter in the stop band and substantially transparent outside the stop band, the insertion of the auxiliary filter in the incoming radiation path being arranged according to the set of circumstances causing the increased relative response.

4. A radiation detection system as claimed in claim 2, for a set of circumstances likely to cause an increase in the detector signals due to the unwanted radiation passing through the filters having the stop band, relative to the signals due to the unwanted radiation passing through the fractional transmission band of the other filters, wherein the auxiliary filter is a pass filter in a region above a predetermined wavelength in the stop band of the filters having the stop band and is opaque below the predetermined wavelength.

5. A radiation detection system as claimed in claim 4, for the detection of a source of wanted radiation having a known minimum wavelength of spectral response wherein the said predetermined wavelength is less than the known minimum wavelength.

6. A radiation detection system as claimed in claim 2, for use in circumstances likely to cause a decrease in the detector signals due to the unwanted radiation passing through the filters having the stop band, relative to the signals due to the unwanted radiation passing through the fractional (small percentage) transmission band of the other filters, wherein the auxiliary filter is a fractional transmission filter outside the said stop band and substantially transparent within it, the insertion of the auxiliary filter in the incoming radiation path being arranged according to the set of circumstances causing the decreased relative response.

7. A radiation detector system as claimed in claim 2, wherein means are provided for adjusting the insertion of the auxiliary filter in the incoming radiation path.

8. A radiation detector system as claimed in claim 3, wherein means are provided for adjusting the insertion of the auxiliary filter in the incoming radiation path.

9. A radiation detector system as claimed in claim 6, wherein means are provided for adjusting the insertion of the auxiliary filter in the incoming radiation path.

* * * * *